United States Patent [19]

Maekawa et al.

[11] 4,224,430
[45] Sep. 23, 1980

[54] RESINOUS COMPOSITION

[75] Inventors: Iwao Maekawa; Isao Uchigasaki; Shouzi Takamizawa; Akira Kageyama, all of Hitachi, Japan

[73] Assignee: Hitachi Chemical Company, Ltd., Japan

[21] Appl. No.: 792,003

[22] Filed: Apr. 28, 1977

[30] Foreign Application Priority Data

Jan. 25, 1977 [JP] Japan .................. 52-6935

[51] Int. Cl.² ............... C08F 36/00; C08F 236/00
[52] U.S. Cl. ............................ 526/282; 526/75; 526/204; 526/272; 526/283; 528/74; 528/297; 528/298
[58] Field of Search ............... 528/74, 298, 297; 260/862, 859 R; 526/282, 283, 75, 272

[56] References Cited

U.S. PATENT DOCUMENTS

| | | | |
|---|---|---|---|
| 2,608,550 | 8/1952 | Rowland et al. | 526/283 |
| 2,671,070 | 3/1954 | Knapp | 526/283 |
| 3,188,303 | 6/1965 | Dissen | 526/283 |
| 3,306,868 | 2/1967 | Adrian | 526/283 |
| 3,322,732 | 5/1967 | Tsuruta et al. | 526/283 |
| 3,347,806 | 10/1967 | Zimmermann et al. | 260/22 |
| 3,957,736 | 5/1976 | Tsuchiya et al. | 526/283 |

Primary Examiner—Joseph L. Schofer
Assistant Examiner—Herbert J. Lilling
Attorney, Agent, or Firm—Craig & Antonelli

[57] ABSTRACT

A resinous composition comprising
(1) 40–90 parts by weight of one or more oligomers obtained by reacting a polyhydric alcohol or its derivative with a monobasic acid of the formula,

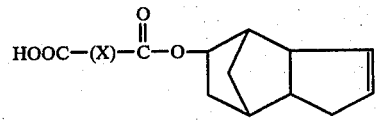

wherein X is an $\alpha,\beta$-unsaturated hydrocarbon group having 2 or 3 carbon atoms, and
(2) 10–60 parts by weight of one or more polymerizable monomers having at least one polymerizable double bond in the molecule, has high solid content and gives molded articles excellent in water resistance, chemical resistance and hardness rise in addition to excellent properties of conventional unsaturated polyester resins.

18 Claims, No Drawings

RESINOUS COMPOSITION

This invention relates to a hardenable resinous composition containing high solid content. More particularly, this invention relates to a resinous composition containing high solid content with decreased styrene odor and without losing excellent properties of conventional unsaturated polyester resins.

Unsaturated polyester resins have been known as a typical example of solvent-free type liquid resins and have been used as industrial materials in many fields such as for producing bathes, vessels for cleanliness, tanks, boats, corrugated sheets, decorative sheets, and the like, since styrene monomer which is used as a solvent contributes to curing reaction almost 100 percent as a crosslinking agent when the resin is cured. Further the unsaturated polyester resins can be handled easily and can be molded into various shaped articles having excellent physical and chemical properties using a simple curing method. Particularly the unsaturated polyester resins are suitable for use as fiber-reinforced plastics (FRP) well balanced in cost and physical properties.

But the unsaturated polyester resins have one serious defect in that they have irritating odor of styrene monomer during storage and before curing due to relatively high vapor pressure, although styrene monomer may be cured almost 100 percent by curing. To improve working environment and due to legal limitation of styrene concentration in the air (e.g. 0.4-2.0 ppm in Japan), unsaturated polyester resins having decreased styrene odor have long been desired.

In order to decrease styrene concentration in an unsaturated polyester resin, there may be possible the following methods:

(1) to use a monomer other than styrene having low vapor pressure,
(2) to decrease the molecular weight of unsaturated polyester resin and to lower molar fraction of the styrene monomer in the unsaturated polyester resin, and
(3) to add a substance which can shelter the styrene monomer from evaporation to the unsaturated polyester resin.

But the method (1) has various problems in low dilution effect of the low vapor pressure monomer due to its general tendency of high viscosity, worse capability of copolymerization with the unsaturated polyester than styrene, great increase of cost, and the like, the method (2) may decrease various physical and chemical properties, and the method (3) has various problems in limit of adding amount, no suitable sheltering agent other than wax, and the like.

It is an object of this invention to provide an unsaturated polyester resin having remarkably decreased styrene odor without decreasing good properties of the unsaturated polyester resin. It is another object of this invention to provide an unsaturated polyester resin having high solid content excellent in water resistance, resistance to chemicals and hardness rise comparing with the conventional unsaturated polyester resins. Further objects and advantages of this invention will be apparent from the following descriptions.

The present invention provides a resinous composition comprising
(1) 40-90 parts by weight of one or more oligomers obtained by reacting a polyhydric alcohol or its derivative with a monobasic acid of the formula,

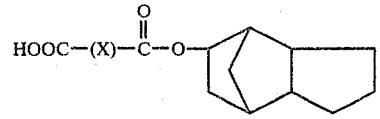

wherein X is an α,β-unsaturated hydrocarbon group having 2 or 3 carbon atoms, and
(2) 10-60 parts by weight of one or more polymerizable monomers having at least one polymerizable double bond in the molecule.

As the polyhydric alcohol, there may be used compounds having two or more alcoholic hydroxyl groups in the molecule such as dihydric alcohols, trihydric alcohols and the like. Examples of the polyhydric alcohols are ethylene glycol, diethylene glycol, propylene glycol, dipropylene glycol, butylene glycol, neopentyl glycol, 1,3-butanediol, 1,4-butanediol, 1,6-hexanediol, trimethylolpropane, trimethylolethane, glycerin, pentaerythritol, and the like.

As the polyhydric alcohol derivative, there may be used polyhydric alcohols having ester bonds, ether bonds, urethane bonds, and the like in the molecule, for example, polyester polyols obtained by reacting n moles of a dibasic acid with (n+1) moles of a polyhydric alcohol, polyether polyols obtained by ring opening alkylene oxides, and polyurethane polyols obtained by reacting n moles of a diisocyanate with (n+1) moles of a polyhydric alcohol.

As the monobasic acid of the formula,

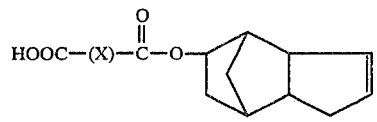

wherein X is as defined above, there may be used compounds obtained by esterification or addition reaction of dicyclopentadiene or hydroxylated dicyclopentadiene with an α,β-unsaturated dicarboxylic acid or anhydride such as maleic anhydride, fumaric acid, itaconic acid, citraconic acid or the like using a known process in the absence of a catalyst or in the presence of, if necessary, an acid catalyst such as a conventional Lewis acid.

The monobasic acid can also be obtained by using waste fluid containing maleic acid as follows. The waste fluid containing maleic acid can be obtained by absorbing in water waste gas containing maleic acid produced in industrial production of maleic anhydride, phthalic anhydride, and the like. The waste fluid is preferably used after concentrated, concentration of maleic acid being preferably 40% by weight or more. Substantially chemically equivalent amount of dicyclopentadiene is reacted with the maleic acid in the waste fluid using a solvent which can form an azeotropic mixture with water and has a lower boiling point than the decomposition temperature of dicyclopentadiene, e.g., toluene, xylene, benzene, diisobutylene, and the like, at a temperature lower than the decomposition temperature of dicyclopentadiene, preferably at 100°–140° C., under reflux, while distilling the water azeotropically, for e.g. about 3 hours. The solvent is used for removing excess water in the waste fluid containing maleic acid by azeotropic distillation smoothly.

In the resinous composition, the oligomer can be obtained by reacting, preferably, 0.8 to 1.2 moles of the polyhydric alcohol or its derivative with 1 mole of the monobasic acid using a conventional condensation method such as a solvent method or a melting method under the reaction conditions usually used for preparing conventional unsaturated polyesters, e.g. at a temperature of 180° to 220° C., if necessary, with addition of a known inhibitor, while controlling acid value. The acid value is measured according to JIS K6901 taking samples during the reaction. It is preferable to terminate the reaction at a stage wherein the acid value is less than 30. If the acid value is more than 30, the resinous composition will be poor in mechanical strengths, resistance to chemicals and heat resistance due to the unreacted compounds present in the oligomer.

One or more oligomers thus obtained are used for obtaining the resinous composition of the present invention. The amount of the oligomer in the resinous composition is 40 to 90 parts by weight per 100 parts by weight of the resinous composition.

If the oligomer is less than 40 parts by weight, the desired high solid resinous composition cannot be obtained. If the oligomer is more than 90 parts by weight, viscosity of the resinous composition increases and the workability becomes worse and further physical properties of the resinous composition decrease.

Another component of the resinous composition of the present invention is the polymerizable monomer having at least one polymerizable double bond in the molecule such as aromatic vinyl compounds, acrylates of polyhydric alcohols, methacrylates of polyhydric alcohols, aromatic allyl compounds, and the like.

Examples of the polymerizable monomers are styrene, divinylbenzene, vinyltoluene, lauryl acrylate, lauryl methacrylate, methyl acrylate, methyl methacrylate, ethyl acrylate, ethyl methacrylate, carbitol acrylate, carbitol methacrylate, diallyl phthalate, triallyl cyanurate; diacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; dimethacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; triacrylates of trimethylolpropane, trimethylolethane, pentaerythritol, and glycerin; trimethacrylates of trimethylolpropane, trimethylolethane, pentaerythritol, and glycerin; and the like. All of these monomers are liquids.

The polymerizable monomer may be used alone or two or more polymerizable monomers may be used in the resinous composition depending on a curing method, workability, processability, a coating method, and the like.

The amount of the polymerizable monomer in the resinous composition is 10 to 60 parts by weight per 100 parts by weight of the resinous composition.

If the polymerizable monomer is less than 10 parts by weight, viscosity of the resinous composition increases, the workability becomes worse and physical properties of the resinous composition decreases, while if more than 60 parts by weight, the desired high solid resinous composition cannot be obtained.

The resinous composition of the present invention can be cured by conventional process using peroxides, redox curing in which a peroxide is used in combination with a curing accelerator, ultraviolet rays, electron beams, far infrared rays and the like. If the resinous composition is cured by using ultraviolet rays, it is necessary to add a conventional photosensitizer to the resinous composition.

As the peroxides, there may be used benzoyl peroxide, methyl ethyl ketone peroxide, di-t-butyl peroxide, lauroyl peroxide, cumene hydroperoxide, t-butyl peroxide, and the like.

As the curing accelerators, there may be used metal soaps in which the metal is cobalt, copper, manganese, lead or the like, tertiary amines, $\beta$-diketones, and the like. There is no limitation to the use and the amount of the peroxides and the curing accelerators.

The resinous composition may further contain pigments, fillers, dyes, and the like if necessary. The resinous composition may further contain fibrous reinforcing materials such as glass fibers, organic fibers, inorganic fibers, and the like. The resinous composition is particularly suitable for molding and can be used as resins for fiber-reinforced plastics for producing bathes, vessels for cleanliness, tanks, boats, corrugated sheets, and the like, and also can be used for producing decorative sheets or used as resins for casting.

Since the resinous composition of the present invention contains the esterified oligomer wherein the end groups of the molecule have been treated with the special compound, it is easy to regulate the molecular weight and to produce high solid content compositions. The resinous composition of the present invention is particularly superior to the conventional unsaturated polyester resins in resistance to chemicals, resistance to boiling, and hardness rise (time required for sufficiently curing a molding composition so that it can be released from a mold).

The present invention is explained in detail by the following Examples, which do not limit the scope of the present invention. In the following Examples, all the parts and percents are by weight unless otherwise specified.

EXAMPLES 1–10, COMPARATIVE EXAMPLES 1–2

(1) Synthesis of maleic acid dicyclopentadiene monoester (MD-1)

In a 2-liter four-necked flask equipped with a condenser, a nitrogen introducing pipe, a thermometer, and a stirrer, 784 parts of maleic anhydride, 144 parts of water, and 1056 parts of dicyclopentadiene were placed and the reaction was carried out under nitrogen stream at 130° C. for 3 hours to give light yellow wax of maleic acid dicyclopentadiene monoester (MD-1).

(2) Synthesis of maleic acid dicyclopentadiene monoester (MD-2)

In a 2-liter four-necked flask equipped with a condenser, a nitrogen introducing pipe, a thermometer and a stirrer, 784 parts of maleic anhydride, and 1200 parts of hydroxylated dicyclopentadiene (Cydecanol, product of Hitachi Chemical Co., Ltd.) were placed and the reaction was carried out under nitrogen stream at 140° C. for 5 hours to give light yellow wax of maleic acid dicyclopentadiene monoester (MD-2).

(3) Synthesis of maleic acid dicyclopentadiene monoester (MD-3)

In a 1-liter four-necked flask equipped with a reflux pipe attaching a water receiver, a thermometer and a stirrer, 582 parts of waste fluid containing maleic acid (water 55%, maleic acid 40%, phthalic acid 4%, and benzoic acid 1%), 264 parts of dicyclopentadiene and 21 parts of toluene were placed. The flask was maintained at 130° C. under nitrogen stream and the reaction was carried out with stirring for 3 hours while removing excess water out of the reaction system azeotropically to give a yellowish brown viscous material (MD-3) having acid value of 226.

(4) Synthesis of maleic acid dicyclopentadiene monoester (MD-4)

In a 1-liter four-necked flask equipped with a reflux pipe attaching a water receiver, a thermometer and a stirrer, 366 parts of waste fluid containing maleic acid (water 30%, maleic acid 63%, phthalic acid 4%, and benzoic acid 3%), 264 parts of dicyclopentadiene, and 10 parts of benzene were placed and the reaction was carried out at 120° C. for 3.5 hours while removing excess water out of the reaction system azeotropically to give a yellowish brown viscous material (MD-4) having acid value of 224.

(5) Synthesis of esterified oligomer (EO-1)

In a 1-liter four-necked flask equipped with a condenser attaching a reflux pipe, a nitrogen introducing pipe, a thermometer and a stirrer, 744 parts of MD-1, 159 parts of diethylene glycol, and 0.01% of hydroquinone and 3.0% of xylene based on the total weight of the charged materials were placed and the reaction was carried out at 210° C. under nitrogen stream using a solvent method. During the reaction, acid value was measured according to JIS K 6901, and the reaction was terminated after 5 hours from the beginning when the acid value became 17.8. After removing the solvent by distillation, there was obtained as esterified oligomer (EO-1) having hydroxyl value of 15.2.

(6) Synthesis of esterified oligomer (EO-2)

Using the same apparatus as used for producing EO-1, 124 parts of ethylene glycol and 148 parts of phthalic anhydride were reacted at 210° C. for 5 hours to give a resinous material having acid value of 9.1. To the resinous material obtained, 496 parts of MD-2 and 0.01% of hydroquinone and 3% of xylene based on the total weight of the charged materials were added and the reaction was carried out at 210° C. under nitrogen stream using a solvent method. During the reaction, acid value was measured according to JIS K 6901, and the reaction was terminated after 7 hours from the beginning when the acid value became 17.1. After removing the solvent by distillation, there was obtained an esterified oligomer (EO-2) having hydroxyl value of 23.1.

(7) Synthesis of esterified oligomer (EO-3)

Using the same apparatus as used for producing EO-1, 318 parts of diethylene glycol and 196 parts of maleic anhydride were reacted at 210° C. under nitrogen stream for 4 hours to give a resin having acid value of 8.1. To the resin obtained, 496 parts of MD-1 and 0.02% of hydroquinone and 2% of xylene based on the total weight of the charged materials were added and the reaction was carried out at 210° C. under nitrogen stream. During the reaction, acid value was measured according to JIS K 6901, and the reaction was terminated after 5 hours from the beginning when the acid value became 25.1. After removing the solvent by distillation, there was obtained an esterified oligomer (EO-3) having hydroxyl value of 20.5.

(8) Synthesis of esterified oligomer (EO-4) 400 Parts of polypropylene ether glycol (Uniol D400, product of Nippon Yushi Co.) and 496 parts of MD-2 were reacted in the same manner as used for producing EO-1 to give an esterified oligomer (EO-4) having acid value of 18.3.

(9) Synthesis of esterified oligomer (EO-5)

Using the same apparatus as used for producing EO-1, 106 parts of diethylene glycol was heated to 100° C. and 250 parts of diphenylmethane diisocyanate was charged thereto to be dissolved uniformly. The reaction was carried out at 95° C. for 5 hours taking care of evolution of heat to give a resinous material containing 0.91% of the unreacted isocyanate therein. To the resinous material obtained, 496 parts of MD-1 and 0.02% of hydroquinone and 3% of xylene based on the total weight of the charged materials were added and the reaction was carried out at 210° C. under nitrogen stream. During the reaction, acid value was measured according to JIS K 6901, and the reaction was terminated after 5 hours from the beginning when the acid value became 26.5. After removing the solvent by distillation, there was obtained an esterified oligomer (EO-5).

(10) Synthesis of esterified oligomer (EO-6)

All of MD-3 obtained in the above-mentioned item 3) and 106 parts of diethylene glycol were reacted in the presence of 0.01% of hydroquinone and 3.0% of xylene based on the total weight of the charged materials at 210° C. under nitrogen stream by a solvent method. During the reaction, acid value was measured according to JIS K 6901, and the reaction was terminated after 5 hours from the beginning when the acid value became 19.3. After removing the solvent by distillation, there was obtained an esterified oligomer (EO-6) having hydroxyl value of 15.2.

(11) Synthesis of esterified oligomer (EO-7)

In a 1-liter four-necked flask equipped with a condenser attaching a reflux pipe, a nitrogen introducing pipe, a thermometer, and a stirrer, 124 parts of ethylene glycol and 148 parts of phthalic anhydride were charged and the reaction was carried out at 210° C. for 5 hours to give a resinous material having acid value of 14.5. To the resinous material obtained, 468 parts of MD-4 and 0.01% of hydroquinone and 3% of xylene based on the total weight of the charged materials were added and the reaction was carried out at 210° C. under nitrogen stream by a solvent method. During the reaction, acid value was measured according to JIS K 6901, and the reaction was terminated after 5 hours from the beginning when the acid value became 26.4. After removing the solvent by distillation, there was obtained an esterified oligomer (EO-7).

(12) Synthesis of unsaturated polyester (Rf-1)

Using the same apparatus as used for producing EO-1, 196 parts of maleic anhydride, 296 parts of phthalic anhydride and 404 parts of propylene glycol were reacted at 210° C. under nitrogen stream. During the reaction, acid value was measured according to JIS K 6901. After 5 hours from the beginning, there was obtained an unsaturated polyester (Rf-1) having acid value of 26.3.

(13) Synthesis of unsaturated polyester (Rf-2)

The process of producing Rf-1 was repeated except for using 316 parts of propylene glycol in place of 404 parts to give an unsaturated polyester (Rf-2) having acid value of 29.1.

The esterified oligomers and unsaturated polyesters thus obtained were mixed with polymerizable monomers to give resinous compositions as listed in Table 1. Physical properties of shaped articles produced from these compositions were as shown in Table 2.

TABLE 1

| | | Example | | | | | | | | | | Comparative Example | |
|---|---|---|---|---|---|---|---|---|---|---|---|---|---|
| | | 1 | 2 | 3 | 4 | 5 | 6 | 7 | 8 | 9 | 10 | 1 | 2 |
| Esterified oligomer (parts) | EO-1 | 80 | — | — | — | — | 80 | 80 | 38 | — | — | — | — |
| | EO-2 | — | 75 | — | — | — | — | — | — | — | — | — | — |
| | EO-3 | — | — | 75 | — | — | — | — | 38 | — | — | — | — |
| | EO-4 | — | — | — | 75 | — | — | — | — | — | — | — | — |
| | EO-5 | — | — | — | — | 75 | — | — | — | — | — | — | — |
| | EO-6 | — | — | — | — | — | — | — | — | 80 | — | — | — |
| | EO-7 | — | — | — | — | — | — | — | — | — | 75 | — | — |
| | Rf-1 | — | — | — | — | — | — | — | — | — | — | 71 | — |
| | Rf-2 | — | — | — | — | — | — | — | — | — | — | — | 62 |
| Polymerizable monomer (parts) | Styrene | 20 | 25 | 25 | 25 | 25 | 5 | 10 | 24 | 20 | 25 | 28 | 38 |
| | Trimethylolpropane triacrylate | — | — | — | — | — | 20 | 20 | — | — | — | — | — |
| Non-volatile component* (%) | | 79.3 | 74.1 | 74.6 | 76.1 | 74.2 | 93.1 | 89.6 | 75.5 | 78.6 | 73.8 | 71.8 | 62.1 |
| Viscosity (Gardner, 25° C.) (sec.) | | 3.1 | 2.8 | 3.2 | 3.1 | 3.5 | 2.5 | 3.8 | 3.4 | 3.0 | 2.5 | 3.0 | 3.4 |
| Concentration of styrene flying away** (ppm) | | 150 | 180 | 160 | 180 | 180 | 110 | 130 | 170 | 150 | 160 | 340 | 400< |

Note for TABLE 1:
*Measured according to JIS K 6901.
**Three layers of glass mat (manufactured by Fuji Fiber Glass Co.) of 450 g/m² with 300 × 300 mm² in size were impregnated in a resinous composition so that the glass content became 30% and laminated. The laminate was covered with a box of 340 × 340 × 300 mm³ immediately after the laminating and styrene concentration after 5 minutes at the height of 100 mm in the box was measured by using Kitagawa's type of indicator tubes.

TABLE 2

| | | Example | | | | | | | | | | Comparative Example | |
|---|---|---|---|---|---|---|---|---|---|---|---|---|---|
| | | 1 | 2 | 3 | 4 | 5 | 6 | 7 | 8 | 9 | 10 | 1 | 2 |
| (1)* | Water absorption (25° C., 24 hrs.) (%) | 0.08 | 0.07 | 0.06 | 0.09 | 0.05 | 0.06 | 0.07 | 0.08 | 0.09 | 0.07 | 0.78 | 0.14 |
| | Appearance after boiling at 98° C. (hrs.) | 52 | 72 | 92 | 40 | 86 | 72 | 72 | 69 | 60 | 72 | 3 | 24 |
| | Bending strength (25° C.) (kg/mm²) | 7.5 | 8.9 | 9.6 | 7.0 | 8.9 | 8.9 | 9.1 | 9.8 | 7.9 | 8.1 | 3.9 | 10.1 |
| (2)* | Bending strength (25° C.) (kg/mm²) | 19.5 | 21.2 | 22.1 | 18.5 | 19.1 | 20.5 | 21.9 | 23.3 | 19.1 | 19.8 | 14.6 | 23.1 |
| | Chemical resistance (25° C., 10 days) (%) | | | | | | | | | | | | |
| | 10% NH₄OH aq. soln. | 0.41 | 0.36 | 0.31 | 0.51 | 0.29 | 0.45 | 0.39 | 0.32 | 0.40 | 0.33 | 4.1 | 1.1 |
| | 20% H₂SO₄ aq. soln. | 0.13 | 0.10 | 0.08 | 0.13 | 0.07 | 0.14 | 0.11 | 0.09 | 0.11 | 0.09 | 0.46 | 0.22 |
| | Hardness rise (25° C.) (min.) | 39 | 35 | 30 | 45 | 40 | 45 | 36 | 30 | 45 | 32 | 136 | 65 |

Note for TABLE 2:
(1)* To a resinous composition, 0.5% of cobalt naphthenate (cobalt content 6%) and 1.0% of methyl ethyl ketone peroxide (50% solution) were added and the resulting mixture was filled in the mold. After-cured at 25° C. followed by after-cure at 50° C. for 12 hours, cast plate with 3 mm thick and size required by JIS K 6911 was cut off. The cast plate was tested according to JIS K 6911. "Appearance after boiling at 98° C." means time required for producing cracks.
(2)* Three layers of chopped strand mats (manufactured by Fuji Fiber Glass Co.) of 450 g/m² were impregnated in a resinous composition so that the glass content became 30-33% and then cured under the same conditions as mentioned in above item (1)* except for changing the after-cure period to 4 hours in place of 12 hours to produce FRP laminated plate. Samples having the required size by JIS K 6911 were cut off from the FRP laminated plate and tested according to JIS K 6911.

"Chemical resistance" is expressed by increasing rate of weight.

"Hardness rise" means time required for curing the composition to hardness of 60 measured by a Barcol hardness tester, type 935 so that it can be released from the mold.

What is claimed is:

1. A resinous composition comprising:
   (1) 40-90 parts by weight of one or more oligomers obtained by reacting by a condensation reaction 0.8 to 1.2 moles of a polyhydric alcohol with 1 mole of a monobasic acid of the formula,

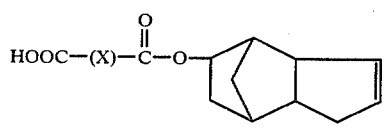

wherein X is an α,β-unsaturated hydrocarbon group having 2 or 3 carbon atoms, and
   (2) 10-60 parts by weight of one or more polymerizable monomers having at least one polymerizable double bond in the molecule.

2. A resinous composition according to claim 1, wherein the polyhydric alcohol is a compound having two or more alcoholic hydroxyl groups in the molecule.

3. A resinous composition according to claim 1, wherein the polyhydric alcohol is a dihydric alcohol.

4. A resinous composition according to claim 1, wherein the polyhydric alcohol is a trihydric alcohol.

5. A resinous composition according to claim 1, wherein the monobasic acid is a reaction product of dicyclopentadiene and maleic anhydride.

6. A resinous composition according to claim 1, wherein the monobasic acid is prepared by using waste fluid containing maleic anhydride.

7. A resinous composition according to claim 1, wherein the monobasic acid is prepared by reacting waste fluid containing maleic acid with dicyclopentadiene under azeotropical reflux.

8. A resinous composition according to claim 1, wherein the polymerizable monomer is an aromatic vinyl compound, an acrylate of polyhydric alcohol, a methacrylate of polyhydric alcohol, or an aromatic allyl compound.

9. A resinous composition according to claim 1, wherein the polymerizable monomer is styrene.

10. A resinous composition according to claim 1, wherein the polymerizable monomer is trimethylolpropane triacrylate.

11. A resinous composition according to claim 1, wherein the one or more polymerizable monomers having at least one polymerizable double bond in the molecule is a liquid.

12. The resinous composition of claim 1, wherein said polyhydric alcohol is selected from the group consisting of ethylene glycol, diethylene glycol, propylene glycol, dipropylene glycol, butylene glycol, neopentyl glycol, 1,3-butanediol, 1,4-butanediol, 1,6-hexanediol, trimethylolpropane, trimethylolethane, glycerin and pentaerythritol.

13. The resinous composition of claim 1, wherein the polymerizable monomer is selected from the group consisting of styrene, divinylbenzene, vinyltoluene, lauryl acrylate, lauryl methacrylate, methyl acrylate, methyl methacrylate, ethyl acrylate, ethyl methacrylate, carbitol acrylate, carbitol methacrylate, diallyl phthalate, triallyl cyanurate; diacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; dimethacrylates of ethylene glycol, diethylene glycol, polyethylene glycol, propylene glycol, dipropylene glycol, 1,4-butylenediol, 1,3-butanediol, 1,4-butanediol, 1,6-hexanediol, and neopentyl glycol; triacrylates of trimethylolpropane, trimethylolethane, pentaerythritol, and glycerin; trimethacrylates of trimethylolpropane, trimethylolethane, pentaerythritol, and glycerin.

14. A resinous composition according to claim 7, wherein substantially equimolar amounts of maleic acid and dicyclopentadiene are reacted in forming the monobasic acid.

15. A resinous composition according to claim 1, wherein the polyhydric alcohol is a derivative of a polyhydric alcohol, said derivative having at least two alcoholic hydroxyl groups.

16. A resinous composition according to claim 15 wherein the alcohol derivative of polyhydric alcohol is a polyester polyol.

17. A resinous composition according to claim 15, wherein the alcohol derivative of polyhydric alcohol is a polyurethane polyol.

18. The resinous composition of claim 15, wherein the derivative of polyhydric alcohol is selected from the group consisting of polyester polyols obtained by reacting n moles of a dibasic acid with (n+1) moles of a polyhydric alcohol, polyether polyols obtained by ring opening alkylene oxides, and polyurethane polyols obtained by reacting n moles of a diisocyanate with (n+1) moles of a polyhydric alcohol.

* * * * *